Figure 1:
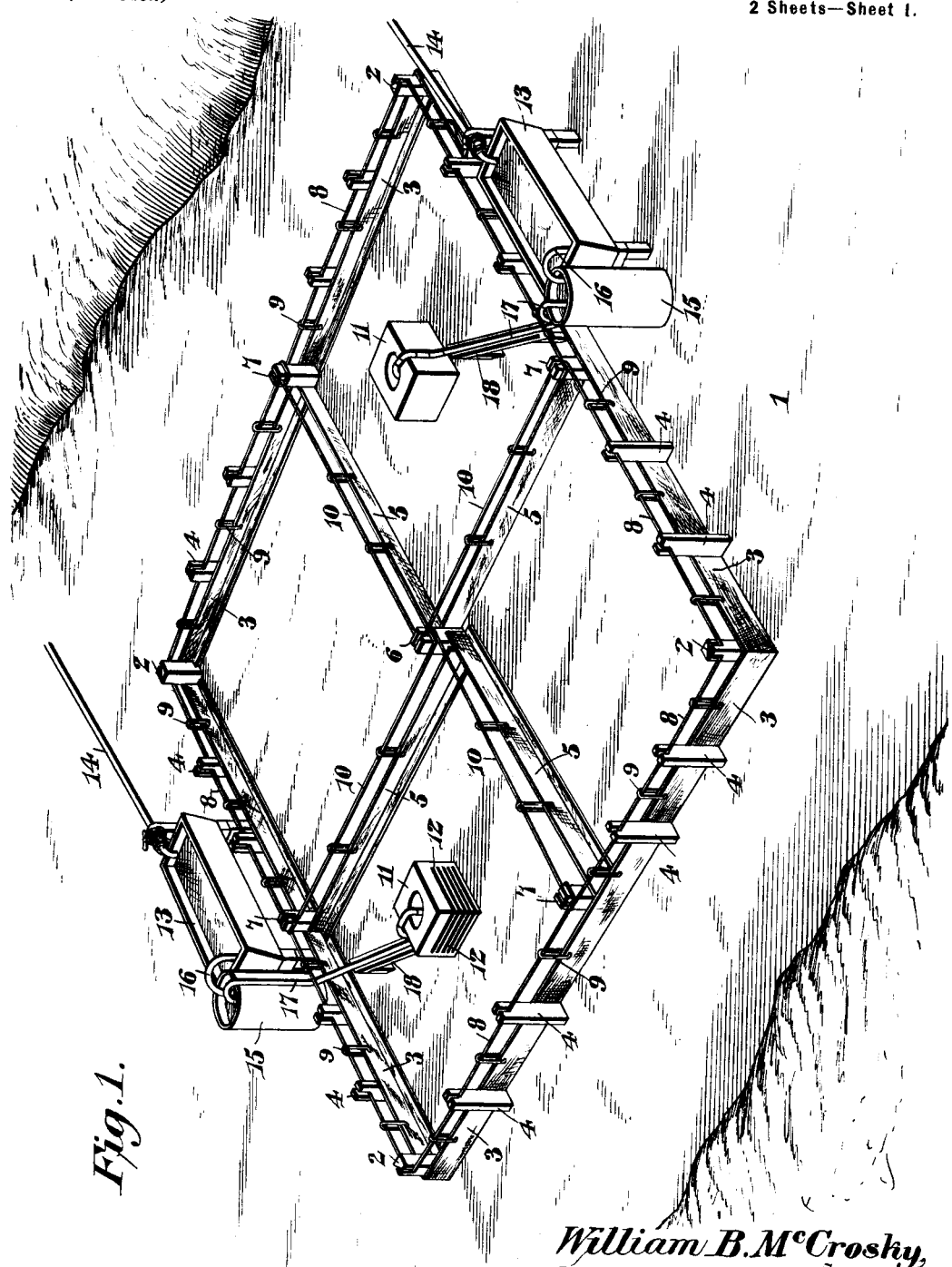

No. 675,965. Patented June 11, 1901.
W. B. McCROSKY.
ICE MAKING APPARATUS.
(Application filed July 27, 1900.)
(No Model.) 2 Sheets—Sheet 1.

William B. McCrosky,
Inventor

Witnesses
Jas. K. McCathran
Louis G. Julihn

By
E. G. Siggers
Attorney

No. 675,965. Patented June 11, 1901.
W. B. McCROSKY.
ICE MAKING APPARATUS.
(Application filed July 27, 1900.)
(No Model.) 2 Sheets—Sheet 2.
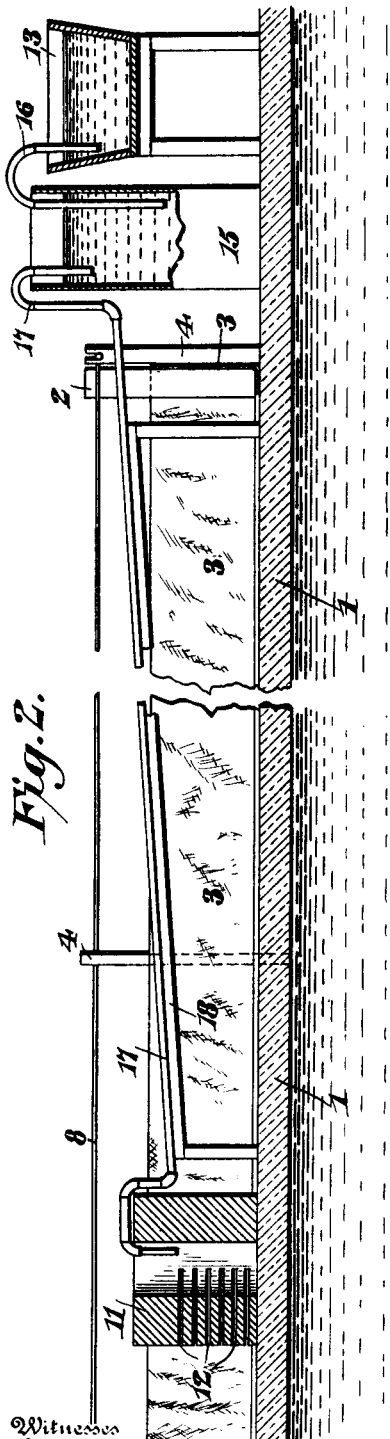
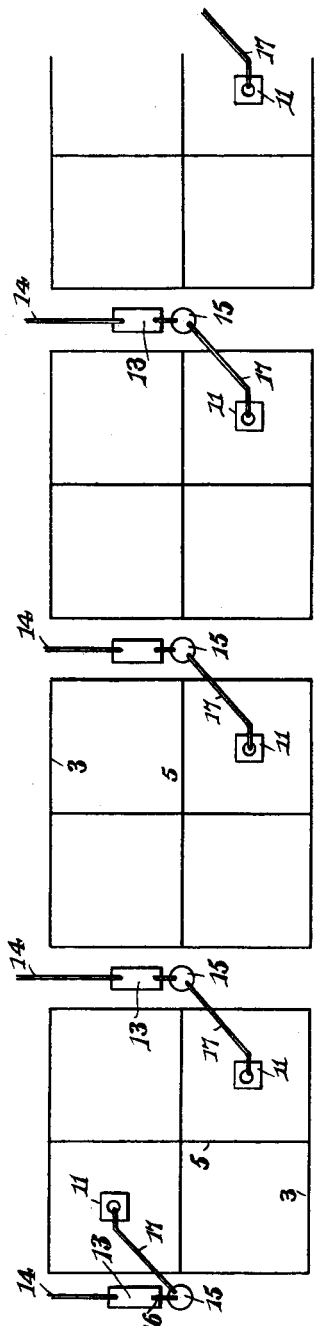
William B. McCrosky, Inventor

UNITED STATES PATENT OFFICE.

WILLIAM B. McCROSKY, OF EUREKA SPRINGS, ARKANSAS.

ICE-MAKING APPARATUS.

SPECIFICATION forming part of Letters Patent No. 675,965, dated June 11, 1901.

Application filed July 27, 1900. Serial No. 25,032. (No model.)

*To all whom it may concern:*

Be it known that I, WILLIAM B. MCCROSKY, a citizen of the United States, residing at Eureka Springs, in the county of Carroll and State of Arkansas, have invented a new and useful Ice-Making Apparatus, of which the following is a specification.

My present invention relates to novel apparatus for forming ice by natural means. It is well understood that under given conditions a body of water exposed to air at a temperature lower than freezing-point will only freeze to a given depth below the surface, because beyond this point the water is protected by the ice from direct contact with the cold air. Even where a considerable thickness of ice can be obtained upon a lake, river, or other body of water the process of freezing is slow, requiring sometimes the elapse of many weeks before a sufficient thickness of ice has formed to warrant the harvesting thereof. Therefore my present invention contemplates the employment of simple and inexpensive apparatus by means of which the thickness of the ice formed upon exposed bodies of water may be quickly increased by the formation within an inclosed area of several superficial layers of naturally-formed ice.

To the accomplishment of my object, which is the formation of ice by natural means, I provide a series of inclosures, defined by muslin walls, erected upon the frozen surface of a pond or river and the provision of novel mechanism for flooding the inclosures or compartments—as, for instance, by spraying a thin sheet of water over the surface of the pond, so that the freezing of such water will add a slight superficial thickness to the ice, which is increased to the desired extent by the formation in a similar manner of subsequent superimposed layers.

In the accompanying drawings, Figure 1 is a view in perspective of my ice-making apparatus complete. Fig. 2 is a diagrammatic sectional view through a portion of the apparatus, showing the relations of the inclosing walls, one of the spray-boxes, and the supply-tank and stand-pipe for supplying said box; and Fig. 3 is a diagrammatical view showing a series of ice-making plants, showing the manner in which the tank and standpipe between the plants is used for the spraying of the adjacent compartments of two plants.

Referring to the numerals of reference employed to designate corresponding parts in the several views, 1 indicates the frozen surface of a body of water upon which my plant is erected. The plant comprises an inclosure, preferably of rectangular form, defined by corner-posts 2, which extend above the surface of the ice and are retained in any suitable manner—as, for instance, by being frozen into the body of ice or by being anchored in the bed of the body of water—it being understood that this post may be either erected after the ice has formed or during the warmer seasons by being driven into the river or lake bed in the manner of ordinary piles. The rectangle thus defined is inclosed within muslin walls 3, additionally supported at any desired number of points between the posts 2 by the provision of supplemental posts 4. The large rectangular compartment thus inclosed is subdivided into four smaller compartments by muslin partition-walls 5, which extend between a center post 6 and partition-posts 7, the post 6 being located in the center of the large inclosure and the partition-posts 7 being located against the outer muslin walls 3 and midway between each pair of corner-posts 2.

The corner-posts 2 and partition-posts 7 constitute supports for the wire stringer 8, which passes continuously around the outside wall 3 and is received within slits or notches formed in the upper ends of the corner-posts 2, partition-posts 7, and the intermediate supplemental posts 4. The stringer 8, while serving to retain all of the posts in their proper positions, also constitutes supports from which are hung at suitable intervals wall-retaining loops 9, which engage the upper edges of the muslin walls 3 to insure the retention of said walls in the proper position. The partition-walls 5 are surmounted by similar stringers 10, extending from the center post 6 to each of the partition-posts 7 and serving, like the stringers 8, to support wall-retaining loops 10', engaging the upper edges of the partition-walls 5. The structure thus far described comprehends muslin walls and partitions suitably retained by a series of posts and having their lower edges frozen to the ice and their upper edges supported from the stringers by suitable links.

I have shown in Fig. 1 of the drawings what may be termed a "single battery or plant," comprehending four rectangular compartments; but I wish it to be understood that I may employ any desired number of these subdivided plants or that I may subdivide each inclosure to form any desired number of compartments therein. It has been premised that the ice is intended to be formed within the compartments thus inclosed by flooding said compartments for the purpose of forming successive layers of ice therein. The means which I employ for this purpose comprehends a hollow spray-box 11, designed to be located upon the ice within a compartment and provided with a vertical series of slits or elongated discharge-openings 12 of any desired extent, but preferably extending substantially half-way around the spray-box and in communication with the interior thereof.

Arranged upon the outside of the wall 3, and preferably supported some little distance above the surface of the ice, I provide a water-tank 13, supplied with water from any suitable source—as, for instance, through a supply-pipe 14—and adjacent to the tank I locate a stand-pipe 15, extending slightly above the tank and communicating therewith through a siphon 16. The water from the supply-tank 13 is designed to be siphoned into the tank 15 through the siphon 16 and to be siphoned from said stand-pipe through a siphon 17 to the interior of the spray-box 11, from which the water is discharged in a thin sheet over the surface of the ice within the compartment in the manner stated. The siphon or line of pipe 17 extending from the stand-pipe 15 to the spray-box is necessarily of considerable length, and therefore in order to prevent the pipe from resting upon the ice I support it upon a trestle or bench 18, as shown in Fig. 1 of the drawings.

Where a single plant is used, as shown in Fig. 1 of the drawings, a pair of spray-boxes, stand-pipes, and supply-tanks are preferably used, as shown, each box being designed to flood two compartments; but where a series of ice plants are erected, as shown diagrammatically in Fig. 3 of the drawings, each spray-box and its connected apparatus are intended to supply two compartments of each adjacent plant, one stand-pipe and supply-tank being located between each pair of plants. The plant having been erected and organized as shown in Fig. 1 of the drawings, it will be evident that the original thickness of the ice may be considerably increased in a comparatively short space of time by successively flooding each of the compartments to form a series of superimposed layers of naturally-formed ice, which having reached a proper thickness may be harvested at any desired time and in any desired manner.

I have referred to the walls 3 as being constructed of muslin. Walls of this character are essential to the practical operation of the apparatus, for the reason that muslin is a fabric of such exceeding thinness that while it detains the water sufficiently for my purpose it does not interfere with such circulation of the air through the wall as is necessary to accomplish the effectual freezing of the water adjacent to the walls. The exceeding thinness of muslin also enables the ice blocks to be cut, if desired, without stripping off the fabric, as the latter does not interfere in the least with the operation of the plows or saws.

While the present embodiment of my invention appears at this time to be preferable, I desire to reserve the right to effect such changes, modifications, and variations as may appear to be expedient, provided that such variations are embraced within the scope of the protection prayed.

Having thus described the invention, what I claim is—

1. In an apparatus for increasing the thickness of ice on exposed bodies of water, the combination with a compartment defined by inclosing walls, of a spray-box supported upon the ice within the compartment and provided with openings at different elevations for successive use, and means for supplying the spray-box with water.

2. In an apparatus for increasing the thickness of ice upon exposed bodies of water, the combination with a compartment defined by inclosing walls, of a spray-box supported upon the ice within the compartment and provided with openings at different elevations for successive use for the purpose of forming successive superficial layers of ice by the successive freezing and flooding of said layers, a supply-tank upon the exterior of the compartment, and means for supplying water to the spray-box from said tank.

3. In an apparatus for increasing the thickness of ice upon exposed bodies of water, the combination with a compartment defined by inclosing walls, of a spray-box supported upon the ice within the compartment and provided with openings at different elevations for successive use for the purpose of forming successive superficial layers of ice by the successive freezing and flooding of said layers, a supply-tank upon the exterior of the compartment, a stand-pipe adjacent to the supply-tank, a siphon connecting the stand-pipe with the supply-pipe, and a second siphon extending from the supply-pipe to the spray-box.

4. In an apparatus for increasing the thickness of the ice upon exposed bodies of water, the combination with a compartment defined by inclosing walls, of a spray-box provided with a vertical series of slits, and means for supplying water to the interior of the spray-box for the purpose of supplying water to the compartment at successively higher elevations to form superficial layers of ice.

5. In an apparatus for increasing the thickness of the ice upon exposed bodies of water, the combination with a series of corner-posts and an outside muslin wall retained by said corner-posts and defining a plant, of partition-posts located intermediate of the corner-posts, a center post located at the center of the plant, muslin partition-walls extending from the center post to each of the partition-posts, and means for supplying the compartments thus defined with thin sheets of water designed to be frozen to form superficial layers of ice.

6. In an apparatus for increasing the thickness of the ice upon exposed bodies of water, the combination with a series of corner-posts, and an outside muslin wall retained by said posts, of a series of intermediate supplementary posts, and partition-posts intermediate of the corner-posts, wire stringers connecting the upper ends of the several posts, a center post located at the center of the compartment formed by the outside wall, wire stringers extending from the upper end of the center post to each of the partition-posts, muslin partition-walls extending from said center post to each of the partition-posts, and a series of loops supported by each of the wire stringers and connected to the upper edges of the walls.

7. In an apparatus for increasing the thickness of the ice upon exposed bodies of water, the combination with a series of corner-posts, and an outside muslin wall retained by said posts, of a series of intermediate supplementary posts, and partition-posts intermediate of the corner-posts, wire stringers connecting the upper ends of the several posts, a center post located at the center of the compartment formed by the outside wall, wire stringers extending from the upper end of the center post to each of the partition-posts, muslin partition-walls extending from said center post to each of the partition-posts, a series of loops supported by each of the wire stringers and connected to the upper edges of the walls, spray-boxes designed to effect the flooding of the several compartments, water-tanks outside of the plant stand-pipes adjacent to said supply-tanks, a siphon intermediate of each supply-tank and the adjacent stand-pipe, and a siphon designed to supply water from each stand-pipe to a spray-box.

In testimony that I claim the foregoing as my own I have hereto affixed my signature in the presence of two witnesses.

WILLIAM B. McCROSKY.

Witnesses:
ED FARDELL,
G. W. BROADRICK.